United States Patent [19]

Morton et al.

[11] 3,992,498

[45] Nov. 16, 1976

[54] REFRACTORY FIBER PREPARATION WITH USE OF HIGH HUMIDITY ATMOSPHERE

[75] Inventors: Michael John Morton; James Derek Birchall; John Edward Cassidy, all of Runcorn, England

[73] Assignee: Imperial Chemical Industries Limited, London, England

[22] Filed: Oct. 11, 1973

[21] Appl. No.: 406,321

Related U.S. Application Data

[63] Continuation of Ser. No. 152,429, June 11, 1971.

[30] Foreign Application Priority Data

June 19, 1970 United Kingdom............... 29909/70

[52] U.S. Cl. ............................. 264/63; 264/176 F; 264/176 R
[51] Int. Cl.$^2$........................................... B28B 3/26
[58] Field of Search................. 264/DIG. 19, 176 R, 264/176 F, 63

[56] References Cited
UNITED STATES PATENTS

| | | |
|---|---|---|
| 2,411,660 | 11/1946 | Manning..................... 264/DIG. 75 |
| 2,571,457 | 10/1951 | Ladisch................................ 264/12 |
| 2,773,282 | 12/1956 | Backer............................... 264/103 |
| 3,017,664 | 1/1962 | Ladisch................................ 264/12 |
| 3,082,054 | 3/1963 | Mayer................................. 264/214 |
| 3,311,481 | 3/1967 | Sterry et al. ......................... 264/12 |
| 3,503,765 | 3/1970 | Blaze ........................... 264/DIG. 19 |
| 3,652,749 | 3/1972 | Sobel................................... 264/63 |

*Primary Examiner*—Donald J. Arnold
*Assistant Examiner*—John Parrish
*Attorney, Agent, or Firm*—Cushman, Darby & Cushman

[57] ABSTRACT

A method for the preparation of refractory fibers wherein a composition comprised of a polar solvent solution of a metal compound and an organic polymer is extruded into converging gas streams which contain vapor of said solvent therein so as to yield a relative humidity of at least 80%, and subsequently removing at least a portion of the solvent from the fiber formed.

38 Claims, No Drawings

REFRACTORY FIBER PREPARATION WITH USE OF HIGH HUMIDITY ATMOSPHERE

This is a continuation of application Ser. No. 152,429, filed June 11, 1971. This invention relates to fibres and in particular to fibres suitable for textile, catalyst and reinforcement purposes.

According to the present invention a process is provided for the preparation of a fibre comprising the steps of (a) fibrizing a composition having a viscosity greater than 1 poise which comprises a solvent, a metal compound soluble in said solvent and an organic polymer soluble in said solvent, and (b) removing at least part of the solvent from the fibre thereby formed.

It is to be understood that the metal compound is soluble in the solvent when it is capable of forming a true solution or a colloidal solution (a sol) with the said solvent.

Preferably the proportion by weight of the metal compound in the said composition is greater than the proportion by weight of the organic polymer, for example when there is at least twice as much metal compound as there is organic polymer. More preferably the organic polymer comprises less than 10% by weight of the metal compound, for example from 2% to 8% by weight, or in some embodiments from 0.1% to 2% by weight.

The metal compound is preferably a water-soluble metal compound, for example a metal salt (which may be a basic salt) which gives a viscous solution or sol in water. Conveniently the water-soluble metal compound may be selected from the group consisting of the chlorides, sulphates, acetates, formates, hydroxides, phosphates and nitrates of aluminium, iron, zirconium, titanium, beryllium, chromium, magnesium, thorium, uranium, yttrium, nickel, vanadium, manganese, molybdenum, tungsten and cobalt or mixtures thereof. Especially preferred are metal salts which can form a refractory oxide, especially aluminium oxychloride, basic aluminium acetate, basic aluminium formate, zirconium oxychloride, basic zirconium acetate, basic zirconium nitrate or basic zirconium formate, mixtures thereof or mixed salts thereof.

The solvent is preferably a polar solvent, for example an alcohol, especially methanol or ethanol, glacial acetic acid, dimethylsulphoxide or dimethylformamide. It is especially convenient to use water as the solvent. Mixtures of solvents may be used.

The organic polymer is preferably a water-soluble organic polymer, conveniently a non-ionic water-soluble organic polymer, a polyhydroxylated organic polymer or a natural water-soluble gum. The organic polymer is preferably thermally stable under the conditions of fibrising, for example from ambient temperature to within several degrees of the boiling point of the solvent. Examples of preferred organic polymers include:

partially hydrolysed polyvinyl acetate
polyvinyl alcohol
polyacrylamide and partially hydrolysed polyacrylamide
polyacrylic acids
polyethylene oxides
carboxyalkyl celluloses, for example carboxymethyl cellulose
hydroxyalkyl celluloses, for example hydroxymethyl cellulose
alkyl celluloses, for example methyl cellulose
hydrolysed starches
dextrans
guar gum
polyvinyl pyrrolidones
polyethylene glycols
alginic acids
polyisobutylene derivatives
polyurethanes, and
esters, copolymers or mixtures thereof.

Most preferred organic polymers are straight-chain polyhydroxylates organic polymers, for example polyvinyl alcohol, partially hydrolysed polyvinyl acetate, polyethylene oxide or polyethylene glycol.

Conveniently the molecular weight of the organic polymer is in the range $10^3$ to $10^7$, preferably as high a molecular weight as is consistent with the ability of the organic polymer to dissolve in the solvent used in the process of the invention. For example, it is preferred for the polyvinyl alcohol or partially hydrolysed polyvinyl acetate to have a medium or high molecular weight, the polyethylene oxide to have a molecular weight of $10^4$ to $10^6$ and the polymers derived from cellulose to have a molecular weight of 10,000 to 50,000.

It is preferred that the concentration of organic polymer in the fibrizing composition be from 0.1% to 2% by weight.

We prefer that little or no chemical reaction should occur between the metal compound and the organic polymer in the fibrising composition.

The viscosity of the fibrizing composition is preferably one suited to the fibrizing method employed. Conveniently the viscosity is in the range 1 to 3000 poise, preferably 100 to 1000 poise, especially when fibrizing is effected by extrusion of the composition through a spinneret to form a continuous filament. Fibrising of compositions of low viscosity, for example 1 to 100 poise, is preferably carried out by a blowing process as hereinafter described.

Fibrizing may be carried out by any convenient method, for example by centrifugal spinning, drawing, blowing or extrusion through a spinneret. Fibrizing by extrusion through a spinneret is especially useful in producing continuous fibre. Fibrizing is most conveniently carried out at the ambient temperature, but if desired it may be carried out at any other temperature at which the fibrizing composition is stable. For example, it may be convenient in some embodiments to vary the temperature in order to produce the viscosity of the composition appropriate for fibrizing.

Fibrizing by blowing comprises extruding the fibrizing composition through one or more apertures into at least one gas stream having a component of high velocity in the direction of travel of the extruded composition. The dimensions and shape of the said aperture may vary widely. We prefer to use an aperture having at least one dimension larger than 50 microns and smaller than 500 microns. The gas stream is preferably air, more preferably air at ambient temperature. It is convenient to employ two streams of gas which converge at or near the point where the composition is extruded from the aperture; perferably the angle between the converging gas streams is from 30° to 60°. At least part of the solvent in the composition is removed by the gas stream, and the rate of removal may conveniently be controlled by mixing the gas with the solvent vapour, for example air at a relative humidity of greater than 80% may be used, especially for aqueous compositions. The velocity of the gas stream may be varied over wide limits, but we prefer to use velocities in the region of 200 to 1500 feet per second. The pressure employed to extrude the composition through the apertures will depend on the viscosity of the composition and on the desired rate of extrusion. We find that pressures from 1 to 100 pounds per square inch absolute are convenient for compositions having viscosities up to about 100 poise.

The fibres produced by blowing are generally of small diameter, typically from 0.5 to 5.0 microns, and are generally in discontinuous lengths, which may however have very high ratios of length to diameter, for example greater than 5000. The fibers may be collected as individual fibres or they may be collected in the form of a yarn, mat or felt. If desired the fibres may be bonded together, for example by collecting the fibres before they are dry and heating the resultant mat or felt. Bonding of the fibres may be effected by the use of a binding agent.

The fibrizing compostion may conveniently be prepared by dissolving the metal compound and the organic polymer in the solvent. The order in which dissolution is carried out is not usually critical, and may be chosen for maximum convenience in each embodiment. An aqueous sol may conveniently be made by hydrolysis or heating of an aqueous solution of the metal compound. The metal compound or the organic polymer may be from a suitable precursor, usually in the presence of the solvent. It may be convenient to concentrate the solution, preferably after filtration to remove solid matter, for example by evaporation of part of the solvent, to achieve the required viscosity for fibrizing. Optionally the fibrizing composition may be de-aerated before fibrizing.

It is preferred to remove solvent from the fibres formed on fibrizing by evaporation, for example by heating at a temperature from 30°C to 110°C, optionally under reduced pressure.

The fibre may be further heated to decompose the metal compound and/or the organic polymer to form a fibre of different composition, especially in embodiments where it is desired to form a fibre comprising a refractory metal oxide, for example alumina or zirconia. Typically, the fibre may be heated at a temperature from 100° C to 2000° C for a period from 5 minutes to 24 hours. The refractory fibre formed may optionally be sintered by further heating at a temperature from 500° C to 2000° C for a period of, for example, 5 minutes to 4 hours. Heating for decomposition or sintering may be carried out in stages, for example in successive steps of increasing temperature.

During the fibrizing and/or the solvent removal and/or the further heating, the fibre may be subjected to tension.

Various additives may be included in the fibre, singly or in any combination, conveniently by adding them to the fibrizing composition. Additives may also be included on the surface of the fibre by any suitable treatment process. Examples of additives which may be included are:

a. grain growth inhibitors, for example compounds of magnesium calcium or aluminium,
b. sintering aids, for example fluorides or salts of sodium or potassium,
c. surfactants, for example alcohols,
d. stabilisers for the fibrizing composition, for example fromic, acetic or tartaric acid,
e. phase-change stabilisers, for example compounds of lithium, calcium, magnesium, hafnium, yttrium, the lanthanides or boric acid,
f. reinforcing particles such as colloidal silica, for example silica made by a plasma process,
g. compound which improve the refractory qualities of a refractory fibre, for example acid oxides, especially $SiO_2$, $B_2O_3$ or $P_2O_5$ or compounds which decompose to form acid oxides,
h. catalyst materials, for example compounds of platinum, copper, palladium, siver, ruthenium, nickel, cobalt, chromium, iron, titanium, vanadium or manganese as hereinafter described,
i. luminescent salts, for example salts of thorium or cerium,
j. colouring agents, for example mordant dyes or pigments.

For embodiments which fibre comprising zirconia is produced, it is preferred to use alumina as grain growth inhibitor, preferably from 0.2% to 20% by weight based on the zirconia content; as phase-change stabiliser for the said fibre it is preferred to use yttria or calcium oxide, preferably from 2% to 15% by weight of the zirconia. It is especially preferred to use alumina in combination with yttria or calcuim oxide in a fibre comprising zirconia.

The fibres of the invention may be treated with a variety of materials. For example, they may be coated with a size, such as polyvinyl alcohol or stearic acid. They may be immersed in a solution of ethyl silicate, washed and heated to give a fibre containing silica. They may also be soaked in solutions of metal salts, and the treated fibres heated to give a fibre containing additional refractory metal oxide.

The invention thus provides a fibre comprising a metal compound and an organic polymer which may be in continuous or discontinuous lengths or in the form of a mat or felt. The proportion by weight of the metal compound in the fibre is preferably greater than the proportion by weight of the organic polymer, for example when there is at least twice as much metal compound as there is organic polymer; more preferably the organic polymer comprises less than 10% by weight of the metal compound, for example 2% to 8% by weight, or in some embodiments from 0.1% to 2% by weight. The invention further provides a continuous, discontinuous, or felted refractory metal oxide fibre, for example a fibre comprising alumina or zirconia. The zirconia is preferably in its tetragonal or cubic form. Usually the fibres have a means diameter from one-half to 50 microns, although the process is not restricted to the production of fibres in this range of diameter. Fibres having diameters from ½ to 5 microns are especially useful as they are strong and flexible. If desired, the continuous fibres may be converted into short lengths, or the fibre may be made in the first place in any convenient length.

As hereinafter disclosed, catalyst materials may be included in or on the fibre.

The invention thus provides a fibrous catalyst comprising a catalyst material and a fibre prepared by a process comprising the steps of (a) fibrizing a composition having a viscosity greater than 1 poise which comprises a solvent, a metal compound soluble in said solvent and an organic polymer soluble in said solvent, (b)

removing at least part of the solvent from the fibre thereby formed and (c) heating the said fibre. The fibre is preferably heated to a temperature sufficient to decompose the organic polymer. The heating may also serve to decompose the metal cmmpound, especially in embodiments where it is desired to form a fibre comprising a refractory metal oxide.

The catalyst material may be present on the surface of the fibre or it may be included within the fibre itself. In some embodiments the catalyst material may be partly within the fibre and partly on the surface. One or more catalyst materials may be present in the fibrous catalyst.

When at least part of the catalyst material is included within the fibre, it is convenient to disperse the catalyst material, or a catalyst material precursor, in the fibrising composition. In preferred embodiments, the catalyst material or its precursor is dispersed in a fibrizing composition comprising an aluminium or zirconium compound. By catalyst material precursor we means a material which, when suitably treated, for example by heating or reduction, will generate a catalyst material, directly or indirectly.

Especially conveniently the catalyst material may be dispersed in the said composition by dissolving it, or its precursor, in the said composition. In preferred embodiments of the invention water-soluble materials, for example salts of catalytic metals, especially metal nitrates, are dissolved in aqueous fibrising compositions.

Dispersion of the catalyst material in the fibrizing composition may also conveniently be carried out by mixing insoluble or partly soluble particulate catalyst material with the fibrizing composition. Preferably the mean size of particles thus dispersed should be smaller than the mean diameter of the fibre produced, and more particularly the particles should be of colloidal size.

Any desired quantity of catalyst material may be dispersed in the fibrizing composition, provided that the fibre formed in still sufficiently strong and coherent for use as a fibrous catalyst. We find that up to about 5% of a suitably sized catalyst material may be incorporated in the fibre without serious deterioration in fibre properties.

It is preferred that the catalyst material be chemically compatible with the constituents of the fibrizing composition. When the fibre is heated to form, for example, a refractory metal oxide, as herein described, it is preferable for the catalyst material to be stable at the temperature of heating. In the case of a catalyst material precursor, it is frequently convenient for the catalyst to be formed from the said precurser during the heating of the fibre.

The catalyst material may be incorporated into the fibre by soaking the said fibre in a solution of the catalyst material or a catalyst material precursor in a suitable solvent and subsequently removing the said solvent from the fibre. Water is a suitable solvent for many catalyst materials or their precursors, for example metal salts. A fibre may be soaked before or after it is heated to form a fibre of different composition as herein described.

The catalyst material may conveniently be deposited in a suitable form on at least part of the fibre surface. For this purpose it may, if desired, be bonded to the said surface by means of a binding agent, which may itself be a catalyst material, for example aluminium phosphate. Bonding may also be effected by means of an application of fibrizing composition to the said surface or to the catalyst material or both, and removal of the solvent of the said composition. Organic polymeric materials may also be used to bind the catalyst to the said fibre surface.

In embodiments in which no binder is used to assist adherence of the catalyst material to the fibre surface, it is often possible to bring about some chemical interaction between the catalyst material and the fibre to improve bonding. In most embodiments of the invention, however, it is satisfactory merely to deposit the catalyst material on the fibre surface in a form sufficiently fine that the normal forces of physical attraction take effect. Thus it is convenient to deposit the catalyst material from a mist or vapour comprising the catalyst material or its precursor. Most conveniently the catalyst material or its precursor is deposited on the fibre surface by treating the said surface with a dispersion comprising the catalyst material or its precursor and a suitable liquid. A solution of the catalyst material or its precursor in a volatile solvent is especially useful. In cases where the catalyst material is dispersed in a liquid which does not dissolve it, it is preferred that the catalyst material be in a finely-divided form, most preferably having a mean size less than 0.5 micron.

It is preferred that the fibre used for preparing the fibrous catalyst comprises a refractory metal oxide, especially alumina or zirconia.

The fibrous catalyst may be further treated, for example to bring about desired changes in the catalyst material. For example, in cases where a catalyst material precursor has been incorporated in or on the fibre, it will be necessary to generate the active catalyst material by a suitable process. The processes normally used include chemical reaction to form a different compound, reduction and heating. Any of the processes, especially heating, may be combined with the step of heating the fibre to decompose the metal compound or the organic polymer of the fibrizing composition. Treatment of the fibrous catalyst to achieve desirable physical changes in the catalyst material may also be carried out; for example, changes in surface area or crystal structure may be desirable to achieve specific catalytic effects. Treatment of the fibrous catalyst to eliminate undersirable substances, for example catalyst poisons, may be useful in some embodiments.

A very wide variety of catalyst materials may be used, and the fibrous catalysts thereby produced may be used in a large number of chemical processes of industrial importance.

Phosphoric acid or sulphuric acid as catalyst material provides a fibrous catalyst useful in adiponitrile synthesis, polymerisation of mixed olefins to gasolines, hydration of olefins to alcohols and alkylation of aromatics.

Fibrous catalysts according to the invention comprising the metals copper, ruthenium, nickel, palladium, platinum or siver, or combinations thereof, are especially useful in processes such as the following:

dehydration of alcohols
methanol synthesis
reduction of nitrobenzene
ammonia decomposition
steam reforming of naphtha or natural gas
hydrogenation of olefins, aromatics, nitrides, fats and oils
sulphur dioxide oxidation
hydrocalkylation methane ammoxidation
ethylene oxide from ethylene
formaldehyde from methanol.

The use of alumina fibre in some of these reactions is preferred, especially in cases where the appropriate phase of alumina is used, for example the "gamma" or "eta" form.

Semiconductor oxides are useful catalyst materials. For example, $Cr_2O_3$ on gamma or eta alumina may be used for paraffin dehydrogenation or naphtha reforming.

Metallic halides, for example $CuCl_2$, $SbCl_3$, $AlCl_3$ or $CrCl_3$, provide fibrous catalysts which are useful for a variety of chlorination and oxychlorination reactions or isomerisation of paraffins, olefins and aromatics.

Organo-metallic catalysts may be best employed in the invention by soaking or coating of the pre-formed fibre. The fibrous catalysts are useful in producing ethylene oligomers, polyethylenes and polyesters. Metal carbonyls, for example $HCo(CO)_4$, provide fibrous catalysts suitable for carrying out OXO processes.

The fibrous catalysts, especially those containing platinum, palladium, molybdenum, $Co_3O_4$, $V_2O_5$, $Cr_2O_3$, $MnO_2$, $Fe_2O_3$ or $NiO$, or combinations thereof, may be used to catalyse the oxidation of car exhaust gases, for example in an afterburner.

Other catalytic materials found useful include:
cobalt molybdate
nickel molybdate
bismuth molybdate
copper molybdate
zinc chromite
cobalt oxide, $Co_3O_4$.

Fibrous catalysts according to the invention are advantageous owing to their high external surface areas; fibrous catalysts comprising a refractory oxide, especially alumina or zirconia are heat-resistant and mechanically strong.

The invention is thus useful in producing fibres which may be of very small diameter, dense, refractory, strong and of high modulus. They may conveniently be used, for example as high temperature insulating materials, fillers, as reinforcement for resins, metals and ceramic materials, inert filters, catalysts or catalyst supports. The fibers may be spun into yarn, which may be woven into cloth.

The invention is illustrated, but not limited, by the following Examples:

EXAMPLE 1

An aluminium oxychloride solution having a molar ratio of Al:Cl of 1.8:1 was prepared by reaction of pure aluminium powder with a solution containing 260 gm/litre of aluminium chloride, under reflux conditions. The solution was carefully filtered through a fine acid-resistant filter paper.

A 2% by weight solution of a partially hydrolysed cold-water-soluble polyvinyl acetate having a high molecular weight was made up by stirring in distilled water for 6 hours. The solution was screened and filtered.

When the polymer solution was free of bubbles, 25 ml was added to 50 ml of the aluminium oxychloride solution, together with 5 drops of glacial acetic acid. The resultant mixture was evaporated on a standard laboratory rotary evaporator at 35° C under reduced pressure. Two hours after stopping the rotary evaporator the solution had a viscosity of 360 poise at a shear rate of 200 sec $^{-1}$ and a viscosity of 700 poise by extrapolation at zero shear rate, as measured on a Ferranti-Shirley cone and plate viscometer.

The solution was introduced into a stainless steel pressure vessel, and extruded under nitrogen pressure via a 10 micron hole size millipore filter through a spinneret with a 100 micron diameter die.

The extruded fibre was wound up at a rate of 600 ft./minute having passed through 15 ft of air at a temperature of 25° C and a relative humidity of 60%.

The diameter of the fibre wound up was 5 microns.

Tensile tests on an Instron tester fitted with an 'A' cell and giving a 2 gm full-scale chart reading gave tensile strengths in the range of 12,000 to 15,000 lb/sq.inch.

On further heating the fibre turned black due to the decomposition of the polymer, and the carbon burned off at temperatures above 500° C to give a white glassy fibre.

EXAMPLE 2

A 2% by weight solution of a medium molecular weight water-soluble polyvinyl alcohol was made up by stirring the polyvinyl alcohol granules in water overnight. The solution was screened and filtered.

50 ml of this solution was added to 50 ml of an aluminium oxychloride solution which on analysis contained 11.2% by weight of aluminium and 8.1% by weight of chlorine. 3 drops of glacial acetic acid were added to the mixture as stabiliser. The solution was evaporated under reduced pressure on a rotary-evaporator to give a viscosity at zero shear rate of 800 poise.

The solution was introduced into a stainless steel pressure vessel fitted with a millipore filter and a spinneret having a 75 micron diameter die. The fibre was extruded under nitrogen pressure and wound up at a collection rate of 400 ft/minute on a drum situated 10 ft below the die. The diameter of the fibre on the drum was 3 microns.

The filter on the drum was re-wound on to a second drum after passing through a tubular furnace at 800° C to give approximately 30 seconds at that temperature. The speed of the second drum was adjusted to approximately 25% less than that of the first to allow for fibre shrinkage. Hanks of fibre from the second drum were heated overnight in an oven at 750° C. The product was a white glassy fibre with a diameter in the range 2 to 2.5 microns. Tensile tests gave strengths in the range 120,000 to 200,000 lb/sq.inch and a modulus in the range 18 to 24 × $10^6$ lb/sq.inch.

EXAMPLE 3

50 ml of an aluminium oxychloride solution containing 11.2% by weight of aluminium and 8.1% by weight of chlorine were mixed with 25 ml of a 2% by weight solution of a medium molecular weight soluble polyvinyl alcohol. 1 g of boric acid and 2 drops of acetic acid were dissolved in the mixture.

The solution was evaporated to a viscosity of 900 poise at zero shear rate, and fibres of diameter 5 microns were collected on a drum by extrusion under pressure through a 100 micron spinneret followed by drawing through 10 ft of air at a relative humidity of 65%.

Hanks of fibre were removed from the drum and suspended in a furnace under tension. The fibre was heated to 800° C over a period of 3 hours and maintained at that temperature for a further 3 hours. The fibre produced appeared white and glassy and had tensile strengths in the range 150,000 to 200,000 lb/sq.inch. They could be woven into a cloth.

EXAMPLE 4

100 gm $ZrOCl_2 \cdot 8H_2O$ were heated with 100 ml of distilled water and 2 gm of CaO and 10 gm of zirconium acetate solution until the CaO had completely dissolved.

50 ml of a 2% by weight solution of a high molecular weight cold-water-soluble polyvinyl alcohol were mixed with the solution prepared and the mixture was evaporated down to a viscous syrup with a viscosity of 800 poise at zero shear rate.

Fibres were extruded from a spinneret and drawn by a wind-up drum situated 10 ft below the 100 micron diameter spinneret die. Fibres having a diameter of 5 microns were collected on the drum which was covered with a polyethylene film.

The polyethylene film was slid off the drum and the fibres were removed from the film without breaking them. The resultant hank of fibre was suspended in a furnace which was heated to 1,000° C over a period of 24 hours.

The products were yellow, polycrystalline stabilised zirconia fibres which were flexible and had a mean tensile strength of 200,000 lb/sq.inch.

EXAMPLE 5

To 50 ml of an aluminium oxychloride solution having a molar ratio of Al:Cl of 1.8:1 and containing 11% by weight of aluminium were added 20 ml of a 0.5% by weight solution of a high molecular weight polyethylene oxide, 1.0 g of boric acid and 20 g of $MgCl_2 \cdot 6H_2O$. 30 ml of water were added and the mixture was stirred at 50° C until all the constituents had dissolved. The solution was evaporated to a clear syrup of viscosity 700 poise at zero shear rate and fibrised by the method described in Example 4 in air at a relative humidity of 45%. Fibres of diameter 4 microns were wound up at a collection rate of 500 ft/minute and heated under tension in a furnace. The furnace was heated to 1000° C at a rate of 100° C increase per hour.

The products were fibres of diameter 2 to 3 microns containing mixed phases of magnesium spinel, aluminium borate and alumina.

EXAMPLE 6

50 ml of aluminium oxychloride solution containing 11.2% by weight of Al and 8.1% by weight Cl were mixed with 30 ml of a 2% by weight solution of a high molecular weight polyvinyl alcohol. The mixture was concentrated by evaporation under reduced pressure to a viscosity of 50 poise. The concentrated solution was introduced into a fibre-blowing device in which two high velocity streams of air impinged from either side at an angle of 30° to a stream of the solution emerging from a 25 micron wide slit under pressure. The air streams were at a temperature of 35° C and a relative humidity of 40%.

A mat of very fine fibres having lengths up to 10 cm and diameters estimated to be 1 micron was collected on a gauze screen. The mat was heated at 800° C for 1 hour to give clear glassy fibres which were silky and flexible.

A second mat of unfired fibres was heated at 600° C for 15 minutes, soaked in an alcoholic ethyl silicate solution, washed with ethanol, and allowed to dry. The fibres were re-heated by raising the temperature to 1000° C over a period of 24 hours to give a flexible silky product with improved tensile strength.

EXAMPLE 7

An aqueous solution was prepared containing the following:

200 g zirconium oxychloride solution (50% w/w $ZrOCl_2 \cdot 8H_2O$)
200 cc zirconium acetate solution (20% w/w $ZrO_2$)
125 cc 2% by weight polyvinyl alcohol solution
12 cc conc. HCl
8 g aluminium oxychloride solution (26% w/w $Al_2O_3$).

The solution was thoroughly mixed and all particles greater than 0.3 micron were filtered out. The solution was concentrated by removal of water at 40° C under partial vacuum until the viscosity measured at 25° C was 4.2 poise. The solution was formed into fibres by extrusion through a series of small holes into a co-current stream of air moving close to sonic velocities. The air stream was at a relative humidity of 90% at 25° C. The fibres formed in this stream were partially dried by a second stream of dry air which mixed with the fibres some 4 ft below the "spinning" nozzles. The fibres were deposited on a moving belt which passed through a furnace at 1000° C with a residence time of 5 minutes in the furnace. The products were soft, white and flexible.

The zirconia was in a crystalline form having a mean crystallite size of 100 A. Stereoscan electron microscope studies showed that the surface of the fibres was essentially smooth, and that the mean diameter was 1 micron.

The fibres were impregnated with a nickel catalyst material as follows:

10 g of zirconia fibre produced above were soaked in a hot (60° C) solution of nickel chloride in water (50% by weight saturated $NiCl_2 \cdot 6H_2O$ at 25° C) for 10 minutes. The fibres were centrifuged whilst still hot, and heated at 800° C for 5 minutes.

The fibres were subsequently heated in a 3/1 by volume mixture of nitrogen and hydrogen at 600° C for 10 minutes to produce black fibres containing 5% by weight of nickel.

EXAMPLE 8

Fibres produced as described in Example 7 were sintered at 145° for 10 minutes to increase the density and improve the strength and stiffness of the fibres. Stereoscan electron micrographs showed that the surface of the fibres was fairly rough. These fibres were coated with cobalt oxide ($Co_3O_4$) by soaking them in a 10% by weight solution of cobalt nitrate hydrate in methanol followed by thorough draining of the fibres and heating at 450° C for 10 minutes. The fibres so produced were black and consisted of a coating of cobalt oxide ($Co_3O_4$) estimated to be about one-tenth micron thick on zirconia fibres. They were strong and flexible.

EXAMPLE 9

Fibres produced as in Example 7 were soaked in a 10% solution of cobalt nitrate hydrate in boiling water.

The fibres were then centrifuged and heated at 500° C in air for 15 minutes. The increase in weight due to the cobalt oxide, $Co_3O_4$, which was deposited in the surface layer and on the surface of the fibre, was approximately 5%.

EXAMPLE 10

Fibres produced as in Example 7 were heated at 1000° C for 3 hours to remove residual chloride ion and coated with cobalt oxide, $Co_3O_4$, as in Example 2. The activity of the catalyst was enhanced by removal of the chloride ion.

EXAMPLE 11

Fibres produced as described in Example 7 and made into the form of a felt of thickness one-tenth inch were sprayed with a 30% w/v solution of cobalt nitrate hydrate. The resultant felt was treated at 450° C in air for 30 minutes. The weight of the fibres had increased by 5% due to the formation of a coating of $Co_3O_4$.

EXAMPLE 12

Fibres produced as described in Example 7 were soaked in dilute sulphuric acid and heated at 700° C for 5 minutes.

EXAMPLE 13

Fibres produced as described in Example 7 were soaked in a 1% by weight solution of chloroplatinic acid in dilute hydrochloric acid. The fibres were subsequently heated at 800° C.

EXAMPLE 14

Fibres were made as described in Example 7, except that the following formulation was used:

200 g zirconium oxychloride solution (50% w/w $ZrOCl_2.8H_2O$)
230 cc zirconium acetate solution (20% w/w $ZrO_2$)
125 cc 2% by weight polyvinyl alcohol solution
40 g aluminium oxychloride (20% w/v $Al_2O_3$) containing 2.0 g $H_2SO_4$.

On firing at 1000° C this formulation gave zirconia in the cubic phase and was particularly useful for 'acid' catalysis.

EXAMPLE 15

Fibres were made using the following fibrising composition:

200 g zirconium oxychloride solution (50%w/w $ZrOCl_2.8H_2O$)
230 cc zirconium acetate solution (20% w/w $ZrO_2$)
125 cc 2% by weight polyvinyl alcohol solution
24 g $NiCl_2.6H_2O$
5.8 g $CuCl_2.2H_2O$ The solution was filtered, evaporated to a viscosity of 4.0 poise, 'blown' into fibres and heated at 800° C for 20 minutes. The fibres were heated further in a 3/1 by volume mixture of nitrogen and hydrogen at 600° C for 15 minutes to generate a highly active catalytic fibre.

EXAMPLE 16

Fibres were produced from the following fibrising composition as described in Example 15:

200 g basic zirconium nitrate solution (20% w/w $ZrO_2$)
230 cc basic zirconium acetate solution (20% w/w $ZrO_2$)
150 cc 2% by weight polyvinyl alcohol solution
20 g $(Co(NO_3)_2.6H_2O$ The fibres produced were heated at 450° C for 30 minutes to produce a fibrous catalyst.

EXAMPLE 17

A solution of suitable viscosity for spinning was prepared by dissolving together the following components in a commercial zirconium acetate solution:

50 g $ZrOCl_2.8H_2O$
115 ml zirconium acetate solution (22% $ZrO_2$)
1.25 g polyvinyl alcohol — medium molecular weight.

The solution was 'blown' into fibres as described in Example 7 and the fibres so formed were heated at 1000° C for 10 minutes to give strong flexible zirconia fibres having a mean diameter of 1 micron.

The fibres were coated by spraying on them a 5% solution by weight of $Ni(NO_3)_2.6H_2O$ in methanol followed by heating at 800° C. The increase in weight of the fibres due to the nickel oxide coating was 5%.

EXAMPLE 18

A solution was prepared from a film-forming grade of polyvinyl alcohol and had the following composition:

200 g zirconium oxychloride solution (50% w/w $ZrOCl_2.8H_2$)
250 cc zirconium acetate solution (20% $ZrO_2$ commercial grade)
150 cc 2% by weight low molecular weight polyvinyl alcohol solution 12 cc conc. HCl
8 g aluminum oxychloride solution (26% w/w $Al_2O_3$).

The solution was filtered to remove all particles greater than 0.5 micron and evaporated to a viscosity of 4 poise under partial vacuum at 40° C. The solution was 'blown' into fibres with high velocity air at 30° C and at a relative humidity of 85%. The fibres were heated at 1000° C for 10 minutes to produce a fibrous catalyst.

EXAMPLE 19

A solution was prepared with the following components:

100 g aluminum oxychloride solution (25% w/w $Al_2O_3$)
10.4 g zirconium acetate solution (22% w/w $ZrO_2$)
64 g 2% w/w solution of polyvinyl alcohol The mixture was concentrated by evaporation to a viscosity of 10 poise, and injected through a 250 micron hole into a high velocity stream of air to give fibres with a mean diameter of 4 microns. The fibres were long and silky with very little shot content.

The fibres were dried at 100° C for 10 minutes at 200° C for half-an-hour and finally fired at 520° C for 1 hour. The product, in the form of a woolly mat, was soft and silky to the touch.

EXAMPLE 20

A solution suitable for the production of a high-tmperature resistant yttria-stabilised zirconia fibre, particularly useful for thermal insulation was prepared from:

500 g zirconium acetate solution (22% w/w $ZrO_2$)
220 cc 1% w/w polyethylene oxide solution
12.8 g yttrium chloride hydrate
2 cc concentrated hydrochloric acid The solution was reduced on a vacuum rotary evaporator to a viscosity of 15 poise at 20° C, and placed in a vessel fitted with a spinneret hole of diameter 0.001 inch.

A high velocity jet of air emerging through slits on either side of this hole and converging at an angle of 30° served to draw down a jet of liquid from the hole to essentially shot-free fibre with a mean diameter of 1.5 micron.

The fibres were dried at 200° C for half-an-hour and fired at 1000° C for half-an-hour to give fibres with a mean diameter of 1 micron.

EXAMPLE 21

A precurser solution suitable for the preparation of continuous zirconia fibres was prepared from the following: 76 c commercial zirconium acetate solution (22% w/w $ZrO_2$) 1 g yttrium oxide, dissolved in 16 cc concentrated HCl 15 cc 1% w/w solution of polyethylene oxide.

The solution was evaporated down on a rotary vacuum evaporator to give a viscous liquid, with a viscosity of 250 poise measured at 25° C.

The solution was introduced into a bomb fitted with a 100 micron hole spinneret and extruded under nitrogen pressure into air at a relative humidity of 70%.

The fibre was drawn off on a 2 ft diameter drum covered with polyethylene film and collected at a rate of 1000 ft/minute.

The hank of fibres was removed from the drum and passed into a drying oven at 200° C for 10 minutes and subsequently heated at 1000° C for 10 minutes to give strong, flexible white fibres with a mean diameter of 6 microns. X-ray crystallographic results showed that the zirconia was in the tetragonal phase.

EXAMPLE 22

A solution suitable for the production of zirconia fibres was prepared by dissolving the following constituents in 115 ml of a commercial zirconium acetate solution (22% w/w $ZrO_2$):

Crystalline yttrium chloride prepared from 3.2 g pure yttrium oxide 50 g zirconium oxychloride ($ZrOCl_2.8H_2O$)
3.0 g medium molecular weight polyvinyl alcohol The solution was diluted with 4 ml of water to give a viscosity suitable for blow spinning, and after filtration, was extruded through a 200 micron hole into a jet of high velocity air to give fibres with a mean diameter of 2 microns.

The fibres were collected as a mat on a wire gauze and after drying at 200° C were fired at 1000° C to give a soft, white and flexible product.

EXAMPLE 23

Zirconia fibres containing cobalt were prepared from a chloride-free system as follows:

13 g cobalt nitrate hexahydrate
125 m 1% w/w solution of polyethylene oxide (molecular weight 300,000)
240 g zirconium acetate solution (22% w/w $ZrO_2$)
3.7 g rare earth oxides (60% w/w $Y_2O_3$) dissolved in 50 ml 30% $HNO_3$ and evaporated to dryness.

These components were mixed together to give a homogenous solution and evaporated to a viscosity of 1.3 poise at 20° C in a rotary evaporator.

Pink fibres were produced by extruding the liquid into a high velocity jet of air. These were dried at 200° C for 1 hour to give a lilac colour, and fired at 800° C for 15 minutes to give grey, flexible fibres.

A portion of the fibres was reduced at 650° C in a stream of hydrogen/nitrogen to give black, flexible fibres containing cobalt metal.

EXAMPLE 24

Zirconia fibres containing copper oxide were prepared as follows:

40 ml of 1% w/w polyethylene oxide solution
240 g zirconium acetate solution (22 w/w $ZrO_2$)
9 g cupric nitrate hexahydrate
3.2 g rate earth oxides (70% w/w yttria grade) (dissolved in minimum nitric acid and evaporated to dryness)

These components were mixed together to form a solution, and evaporated to a viscosity of 3.7 poise using a rotary vacuum evaporator. The solution was filtered and extruded as a jet into a high velocity air stream.

The pale green fibres formed were collected on a wire gauze and fired for 15 minutes at 800° C. The products were strong and flexible.

EXAMPLE 25

Zirconia fibres containing 10% alumina and 3% cobalt were prepared from:

100 g 50% w/w solution of $ZrOCl_2.8H_2O$
115 cc zirconium acetate solution (22% w/w $ZrO_2$)
27.4 g aluminium oxychloride solution (26% w/w $Al_2O_3$)
125 cc 1% w/w polyvinyl alcohol solution of high molecular weight
6.4 g cobalt chloride hexahydrate The solution was evaporated down to give a viscosity of 1.4 poise, measured at 20° C, and the liquid was injected as a jet from a 200 micron hole into a high velocity stream of air, and fibres with a mean diameter of 2 microns were collected on a gauze.

The blue fibres were dried at 200° C, at which temperature they turned green, and were subsequently fired directly at 800° C to give a mauve-grey product.

A portion of the fibres was re-fired at 1000° C for 1 hour, to give bright blue, flexible, soft fibres, in the form of a mat with strength similar to paper tissue.

EXAMPLE 26

A solution was made up consisting of:

100 g 50% w/w $ZrOCl_2.8H_2C$
115 cc zirconium acetate (22% w/w $ZrO_2$) solution
62 cc 1% w/w solution of polyethylene oxide 6.7 g NiCl$_2$.6H$_2$O
27.4 g aluminium oxychloride solution (9.3% w/w Al)

The mixture was filtered and approximately 150 cc of water were removed on a rotary evaporator to give a solution having a viscosity of 3 poise.

Fibres were formed by injecting a jet of the solution through a 300 micron hole into a high velocity stream of air.

The fibres were collected on a gauze, dried at 200° C and fired at 800° C for 1 hour.

The fibres were off-white in colour, were flexible with a soft feel and a silky sheen.

A portion of the fibres was reduced in hydrogen at 650° C to give a black product without appreciable loss of strength.

EXAMPLE 27

Zirconia fibres containing platinum for use as an oxidation catalyst were prepared from:

200 g zirconium oxychloride solution (50% w/w ZrOCl$_2$.8H$_2$O)
230 cc zirconium acetate solution (22% w/w ZrO$_2$)
250 cc 1% w/w polyvinyl alcohol solution
6.7 g rare earth oxides (60% w/w Y$_2$O$_3$ grade) dissolved in 16 cc concentrated HCl
0.29 g chloroplatinic acid hydrate The solution was evaporated to a viscosity of 4 poise, measured at 20° C, and blown into fibres by injecting into a high velocity air stream.

The fibres were dried at 100° C and fired for 1 hour at 800° C. They were white, strong and flexible.

EXAMPLE 28

Fibres were prepared from the following formulation:

575 g zirconium acetate solution (22% w/w ZrO$_2$)
253 cc 1% w/w polyethylene oxide solution
14.7 g rare earth chlorides (60% w/w yttria grade)
18.8 g Co(NO$_3$)$_2$.6H$_2$O The solution was evaporated down to a viscosity of 6 poise and blown into fibre with a mean diameter of 3 microns. These were dried for half-an-hour at 200° C and fired at 800° C for 1 hour to give soft flexible fibres.

EXAMPLE 29

A solution was made up from the following formulation:

250 g zirconium acetate solution (22% w/w ZrO$_2$)
31 g aluminium oxychloride (10% w/w Al)
110 cc 1% w/w solution of polyethylene oxide
28 cc calcium chloride solution (10% w/w CaO)

The solution was evaporated on a rotary evaporator to a viscosity of 10 poise at 20° C and formed into fibres by injecting into a high velocity stream of air, to give fibres with a mean diameter of 3 microns.

The fibres were dried at 200° C for half-an-hour and fired at 1000° C for 1 hour. The fibres were white, soft and flexible. X-ray analysis showed that the zirconia was in the cubic phase.

EXAMPLE 30

Fibres were made from the following formulation:

250 g of zirconium acetate solution (22% w/w ZrO$_2$)
28 cc calcium chloride solution (10% w/w CaO)
110 cc polyethylene oxide solution (1% w/w)
32 g aluminium oxychloride solution (10% w/w Al)
7 g cobalt nitrate hydrate The solution was evaporated on a rotary evaporator to a viscosity of 20 poise at 20° C and allowed to stand for 24 hours. By this time a very fine suspension had formed in the solution, whose viscosity had reached 50 poise.

The solution was formed into fibres by extrusion under 10 lb/sq.inch pressure through a 250 micron hole into high velocity streams of air which converged from two slots each making an angle of 30° to the liquid jet.

The fibres, with a mean diameter of 3 microns, were collected on a wire gauze, dried at 200° C and calcined at 800° C for 30 minutes, followed by 30 minutes at 1000° C. The products were sky-blue in colour, strong and flexible.

EXAMPLE 31

Fibres containing bismuth and molybdenum oxides were prepared from the following formulation:

3.1 g bismuth nitrate
2.4 g ammonium molybdate
100 g zirconium oxychloride solution (20% w/w ZrO$_2$)
115 cc zirconium acetate solution (22% w/w ZrO$_2$)
125 cc polyvinyl alcohol solution (1% w/w)
30 g aluminium oxychloride solution (10% w/w Al)
5 cc concentrated hydrochloric acid The homogenous solution was evaporated to a viscosity of 6 poise (20° C) and formed into fibres by injecting through a 300 micron hole into a convergent high velocity stream of air. The fibres were dried at 200° C and fired for 10 minutes at 800° C to give a pale-yellow product with a mean diameter of 6 microns.

EXAMPLE 32

A solution was prepared by mixing 47 parts by weight of aluminium chlorophosphate hydrate with 53 parts by weight of a 1% w/w aqueous solution of polyethylene oxide of molecular weight 300,000. The solution had the following composition:

|  | % w/w | Molecular ratio |
|---|---|---|
| Cl | 14.6 | 0.81 |
| Al | 13.6 | 1.00 |
| PO$_4$ | 44.9 | 0.93 |
| H$_2$O | 23.4 | 2.58 |

The mixture was slightly turbid and after filtration gave a clear solution of 9.4 poises, viscosity at 20° C. The solution was injected through nine triangular holes, each of height 0.01 inch at base 0.02 inch into a high velocity air stream which had been saturated with water at 6 lb/sq. inch and 16° C. Fibres of 3 to 4 microns in diameter were produced and these, after firing for 1 hour at 200° C and 2 hours at 500° C, gave a stable fluffy mat.

The air stream was projected from two slits each 0.005 to 0.008 inch by 1 inch, 0.04 inch apart impinging at an angle of 60° and arranged at either side of the row of holes. The air flow rate was 70 liters/inch at atmospheric conditions.

EXAMPLE 33

A solution was prepared by mixing 45 parts by weight of aluminium chlorophosphate hydrate and 55 parts by weight of the 2% w/w polyethylene oxide solution. Filtering was unnecessary and the solution viscosity was found to be 1.6 poise at 20° C.

Fibres 1 to 2 microns in diameter containing some shot were formed when the solution was injected through a 0.005 inch jet into a high velocity stream of dry air.

EXAMPLE 34

Aluminium fibres containing boric acid were made from the following composition:

50 ml aluminium oxychloride solution (10% w/w Al)
86 ml boric acid solution (2% w/w)
0.6 g phosphoric acid (100)
13,4ml colloidal silica (33% w/w $SiO_2$)
8 drops glacial acetic acid
5 ml polyacrylamide solution (1% w/w)

The solution was filtered through a fine micron filter, preceded by a glass micronfibre filter.

The solution was evaporated at 40° C with a vacuum rotary evaporator until glassy fibres could be pulled from the surface with a spatula.

The solution was de-aerated by leaving under vacuum in a closed vessel for 15 hours.

The solution which had a viscosity of 800 poise at 25° C at zero shear, was extruded through a 100 micron spinneret using a pressure of 500 lb/sq. inch into air at a relative humidity of 60%. The fibre was wound up on a drum at at rate of 200 ft/mintue.

The fibres were removed from the drum, dried at 100° C and heated in a furnace to 700° C. They were clear and glassy with a diameter of 10 microns.

EXAMPLE 35 an acidic catalyst for cracking reactions was prepared as follows:

A sample of mirconium oxychloride was dissolved in 1:1 mixture of HCl and water and recrystallised to reduce the level of the sodium impurity. The crystals were redissolved in water, and dialysed against a 20% by weight solution of acetic acid until the pH was approximately 2, thereby reducing the chloride content.

Sufficient polyethylene oxide solution (molecular weight 300,000) and aluminium sulphate solution were added to give respectively 1% w/w polymer and 12% w/w $Al_2O_3$ content based on the $ZrO_2$ content of the solution.

The solution was evaporated down to a viscosity of 10 poise and injected through a series of holes of 0.015 inch diameter at the point of convergence of high velocity air streams which emerged from two slots at a mutual angle of 60°.

The jets of liquid were attenuated and partially dried by the air streams to give essentially shot-free fibres with a mean diameter of 3 microns. The fibres were collected on a gauze.

The fibres were dried at 200° C and calcined for 30 minutes at 800° C to give white, soft, flexible fibres.

A 1 g sample was placed in a catalytic reactor tube and a stream of cumene vapour was passed over the catalyst at a temperature of 450° C and at a weight hourly space velocity of 5 $hr^{-1}$. Analysis of the product showed that cumene cracking had taken place and there was 5% by volume of benzene in the product.

Analysis of the zirconia fibre confirmed that there was 12% by weight of alumina in the fibre. The level of sodium impurity was 0.1% by weight.

EXAMPLE 36

1.067 g of a fibre prepared as described in Example 24 was pushed firmly into a 1.5 cm internal diameter Pyrex reactor tube. Nitrogen, together with ethylene, oxygen and hydrogen chloride could be passed through the catalyst bed at temperatures up to 350° C. The temperature of the catalyst was measured directly by means of a thermocouple.

The catalyst was treated initially in a stream of HCl and nitrogen for 1½ hours at 300° C. The catalyst was cooled to 200° C, and ethylene and oxygen added to the reactor feed. The composition of the gas was:

|  | % by volume |
|---|---|
| $N_2$ | 60 |
| HCl | 20 |
| $C_2H_4$ | 10 |
| $O_2$ | 10 |

The ethylene flow rate was $1.25 \times 10^{-4}$ moles/minute.

Samples of the gas leaving the reactor were sampled for gas chromatographic analysis for ethylene and cholorine-containing products.

Oxychlorination was detected at 200° C, the major product being 1,2-dichloroethane. Ethyl chloride was also detected. The amounts of each were small, corresponding to conversions of 0.34% and 0.11% respectively of the ethylene.

Conversions are here defined as (number of moles of given compound produced in unit time) x 100 divided by (number of moles of ethylene passed through the reactor in unit time).

As the temperature was increased, the selectivity of the reaction towards 1,2-dichlorethane, the desired product, reached a steady value of about 90%. (The selectivity is defined as (number of moles of 1,2-dichloroethane produced in unit time) x 100 divided by (total number of moles of all compounds produced in unit time).) At 300° C and above vinyl chloride was detected while at 350° C small amounts of cis and trans dichloroethylene were found.

Ethylene conversions and the reaction selectivity are detailed in the following Table:

Table

| Temp °C | Ethyl chloride | 1,2-dichloro-ethane | Vinyl chloride | Dichloro-ethylene cis | trans | Selectivity |
|---|---|---|---|---|---|---|
| 200 | 0.1 | 0.3 | — | — | — | 75 |
| 250 | 0.3 | 3.3 | — | — | — | 92 |
| 300 | 1.2 | 16.5 | 0.2 | — | — | 92 |
| 350 | 1.2 | 26.0 | 1.2 | 0.4 | 0.2 | 90 |

EXAMPLE 37

1.47 g of a catalyst comprising 0.3 weight % platinum in zirconia fibre (prepared as described in Example 27) was packed into a silica reactor having an internal diameter of 2.5 cm and a thermocouple pocket of diameter 0.8 cm down its axis. The catalyst occupied a volume of 11 cc.

A gaseous mixture containing 1.27 v % carbon monoxide and 1.32 v % oxygen in nitrogen was passed over the catalyst with a space velocity of 23,200 hr$^{-1}$. The concentrations of carbon monoxide, carbon dioxide and oxygen in the exit stream from the reactor were monitored. The catalyst 'lit off' at 300° c and at 460° C there was a 97% conversion of carbon monoxide to carbon dioxide.

Under the conditions of the test the non-catalysed homogenous oxidation of carbon monoxide to carbon dioxide does not become significant until temperatures in excess of 830° C are reached.

EXAMPLE 38

Catalytic zirconia fibres containing 3% cobalt and 1% copper were prepared from:

115 ml zirconium acetate solution (22% $ZrO_2$)
2.2 g 60% yttria grade of rare earth oxides, dissolved in
 5 cc concentrated $HNO_3$ and heated to dryness
65 ml 1% solution of polyethylene oxide
1.26 g $Cu(NO_3)_2.3H_2O$
4.9 g $Co(NO_3)_2.6H_2O$ The solution was filtered to remove particles greater than 0.3 micron and evaporated to a viscosity of 2.8 poise.

The solution was placed in a vessel with a wedge-shaped head containing 250 micron holes in a row. On either side of these holes, air emerged from 250 micron wide slots parallel to the row of holes and converging at an angle of 30° onto the liquid jets from the holes. Fibres were formed from the liquid which emerged using no applied pressure, using attenuating air at a presure of 10 lb/sq. inch measured in the reservoir above the air slots. The attenuating air was passed through a packed wetting column containing water at 23° C.

The fibres were collected on a gauze in the form of a mat some 4 ft below the spinning unit.

The fibres were dried at 200° C and fired at 800° C for half-an-hour. Some of these fibres were reduced in a stream of $H_2/N_2$ at 650° C. The mean diameter was 3 microns.

EXAMPLE 39

Tetragonal zirconia fibres containing 2% w/w of aluminium as the oxide to control the grain size of the zirconia were prepared as follows:

100 g zirconium oxychloride solution (50% w/w $ZrOCl_2.8H_2O$)
115 ml zirconium acetate solution (22% w/w $ZrO_2$)
125 ml polyvinyl alcohol solution (1% w/w)
8 g aluminium oxychloride solution (26% w/w $Al_2O_3$)
3 g yttrium oxide
8 ml concentrated hydrochloric acid The solution was evaporated to a viscosity of 2 poise, and fibres with a mean diameter of 1 to 2 microns were collected using a 'blowing' device. The fibres were dried at 100° C and subsequently fired at 1000° C for 2 hours. X-ray analysis showed that the fibres contained tetragonal zirconia with a crystallite size estimated at 265 A.

A sample of these fibres was heated to 1450° C for 15 minutes, after which the fibres were noticeably stiffer but still strong and flexible.

EXAMPLE 40

Zirconia fibres containing 3% w/w cobalt and 1% manganese, with approximately 7% rare earth oxides as a phase stabiliser, were prepared from the following formulation:

250 g zirconium acetate solution (22% w/w $ZrO_2$)
110 ml 1% w/w solution of polyethylene oxide
9.5 g rare earth chlorides (50% w/w yttria grade)
8.1 g cobalt nitrate hydrate
1g manganous chloride hydrate The solution was evaporated to a viscosity of 10 poise and extruded through holes with a diameter of 0.015 inch using 3 lb/sq. inch absolute pressure into a high velocity stream of air emerging from converging slots at an angle of 30° to the liquid jets; the pressure of the attenuating air was 10 lb/sq. inch.

The fibres were dried at 200° C, fired at 800° C for half-an-hour and reduced in a hydrogen/nitrogen atmosphere at 700° C to give a black, fibrous mat. Rolled mats of these fibres were prepared for catalytic oxidation reactions.

EXAMPLE 41

0.76 g of a catalyst comprising 3 weight % cobalt, 1 weight % copper, 7 weight % rare earth oxides in zirconia fibre (prepared as described in Example 38) was packed into a silica reactor having an internal diameter of 2.5 cm. There was a thermocouple pocket of 0.8 cm diameter down the axis of the tube. The catalyst occupied a volume of 17 cc.

A gaseous mixture comprising 1.23 v % carbon monoxide and 1.34 v % oxygen in nitrogen was passed over the catalyst at a space velocity of 15,000 hr $^{-1}$. The catalyst 'lit off' at 250° C and at 375° C there was a 75% conversion of carbon monoxide to carbon dioxide.

What we claim is:
1. A process for the preparation of a fibre comprising the steps of:
 a. providing a fibrizing composition comprising an aqueous polar solvent solution of a metal compound and a water-soluble organic polymer, wherein the molecular weight of the polymer is from $10^3$ to $10^7$, the viscosity of the solution is from 1 to 100 poise, the metal of the said metal compound is selected from the group consisting of aluminum, iron, zirconium, titanium, beryllium, chromium, magnesium, thorium, uranium, yttrium, nickel, vanadium, manganese, molybdenum, tungsten and cobalt, and the proportion by weight of the metal compound is greater than the proportion by weight of the organic polymer;
 b. extruding the said fibrizing composition through one or more apertures into at least two gas streams which have vapour of the said solvent mixed therewith to produce a relative humidity of at least 80%, said gas streams having a component of high velocity in the direction of travel of the extruded fibriz- ing composition and said gas streams converging at or near the point where the fibrizing composition is extruded from the apertures, whereby discontinuous lengths of fibres are produced; and c. removing at least part of the said polar solvent from the fibre thereby formed.

2. A process as claimed in claim 1 wherein the organic polymer comprises less than 10% by weight of the metal compound.

3. A process as claimed in claim 2 wherein the organic polymer comprises from 0.1% to 8% by weight of the metal compound.

4. A process as claimed in claim 1 wherein the metal compound is water-soluble.

5. A process as claimed in claim 1 wherein the metal compound is a metal salt or basic metal salt which gives a viscous solution or sol in water.

6. A process as claimed in claim 1 wherein the metal compound is selected from the group consisting of the chlorides, sulphates, acetates, formates hydroxides, phosphates and nitrates.

7. A process as claimed in claim 1 wherein the metal compound is a metal salt which can form a refractory oxide.

8. A process as claimed in claim 1 wherein the metal compound is aluminium oxychloride, basic aluminium acetate, basic aluminium formate, zirconium oxychloride, basic zirconium acetate, basic zirconiumm nitrate or basic zirconium formate.

9. A process as claimed in claim 1 wherein the solvent is water.

10. A process as claimed in claim 1 wherein the organic polymer is a straight-chain polyhydroxylated polymer.

11. A process as claimed in claim 1 wherein the organic polymer is polyvinyl alcohol or partially hydrolysed polyvinyl acetate.

12. A process as claimed in claim 1 wherein the organic polymer is polyethylene oxide or polyethylene glycol.

13. A process as claimed in claim 11 wherein the polyvinyl alcohol or partially hydrolysed polyvinyl acetate has a medium or high molecular weight.

14. A process as claimed in claim 1 wherein the aperture has at least one dimension from 50 microns to 500 microns.

15. A process as claimed in claim 1 wherein the gas streams are air.

16. A process as claimed in claim 15 wherein the air is at the ambient temperature.

17. A process as claimed in claim 1 wherein the angle between the converging gas streams is from 30° to 60°.

18. A process as claimed in claim 1 wherein the gas streams have a velocity of 200 to 1500 feet per second.

19. A process as claimed in claim 1 wherein the fibres are collected in the form of a mat or felt.

20. A process as claimed in claim 19 wherein the fibres are bonded together.

21. A process as claimed in claim 1 wherein the fibrizing composition is concentrated before fibrizing.

22. A process as claimed in claim 1 wherein the fibrizing composition is de-aerated before fibrizing.

23. A process as claimed in claim 1 wherein solvent is removed from the fibres by evaporation.

24. A process as claimed in claim 1 wherein the fibre is heated to decompose the metal compound and /or the organic polymer.

25. A process as claimed in claim 24 wherein the fibre is heated at a temperature from 100° C to 1000° C.

26. A process as claimed in claim 24 wherein a fibre comprising a refractory oxide is sintered by further heating.

27. A process as claimed in claim 26 wherein sintering is carried out at a temperature from 500° C to 2000° C.

28. A process as claimed in claim 24 wherein heating is carried out in successive steps of increasing temperature.

29. A process as claimed in claim 1 wherein the fibrising composition comprises a phasechange stabiliser.

30. A process as claimed in claim 29 wherein the phasechange stabiliser comprise a compound of calcium, yttrium or the lanthanides.

31. A process as claimed in claim 1 wherein a fibrous catalyst is produced by fibrizing a composition comprising at least one catalyst material or a precursor thereof and heating the fibre thereby formed.

32. A porcess as claimed in claim 31 wherein the catalyst material or precursor thereof is dissolved in the fibrising composition.

33. A process as claimed in claim 31 wherein the catalyst material or precursor thereof is water-soluble.

34. A process as claimed in claim 31 wherein the catalyst material is dispersed in the fibrising composition as insoluble or partly soluble particles of colloidal size.

35. A process as claimed in claim 31 wherein the catalyst material is one or more of the metals copper, ruthenium, nickel, palladium, platinum or silver.

36. A process as claimed in claim 31 wherein the catalyst material is one or more of the halides of copper, antimony, aluminium or chromium.

37. A process as claimed in any one of claim 31 wherein the catalyst material is a molybdate of cobalt, nickel, maganese, iron or nickel; or zinc chromite.

38. A process as claimed in claim 1 wherein the fibre formed is a zirconia fiber and the fibrizing composition contains a grain growth inhibitor which is an aluminium compound.

* * * * *